June 28, 1966  J. H. B. GEORGE  3,258,307
PROCESS FOR SEPARATING CADMIUM AND ZINC FROM MIXTURES THEREOF
Filed May 20, 1963
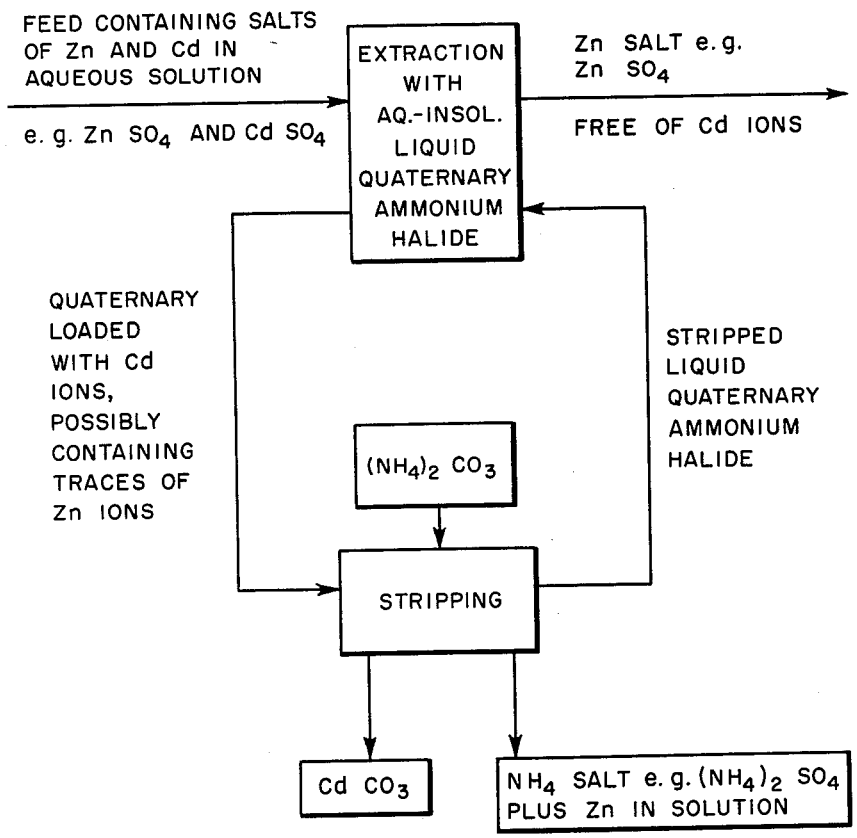
INVENTOR.
James H. B. George
BY
Agent

United States Patent Office 3,258,307
Patented June 28, 1966

3,258,307
PROCESS FOR SEPARATING CADMIUM AND ZINC FROM MIXTURES THEREOF
James H. B. George, Cambridge, Mass., assignor to Arthur D. Little, Inc., Cambridge, Mass., a corporation of Massachusetts
Filed May 20, 1963, Ser. No. 281,653
10 Claims. (Cl. 23—61)

This invention relates to a process for separating cadmium and zinc from mixtures of compounds thereof.

Cadmium is ordinarily found in nature as a minor constituent of zinc ores. These ores are usually subjected to a smelting operation for the recovery of zinc. The cadmium is deposited in the fumes from the Cottrell precipitators; these fumes are calcined and then treated with sulfuric acid to dissolve the cadmium and zinc as water-soluble sulfates. Any lead present is also converted to the sulfate, but as this is virtually insoluble in water it can be separated from the soluble sulfates. The latter are then commonly treated with zinc dust to recover the cadmium as cadmium metal. This gives products of uncertain purity, as the separation is never 100% with respect to either the zinc or the cadmium.

With the increasing demand for these metals in pure form, uncontaminated with each other, a simple process for their separation is of particular interest.

Objects of this invention are accordingly to separate cadmium and zinc values from mixtures of compounds thereof; to do so in a manner such that substantially 100% separation is attainable; to employ an extractant which can be readily stripped and recycled; and to carry out the process in a simple and straight-forward manner without requiring unusual apparatus or conditions of operation or the consumption of expensive reactants or treating agents. Other objects will appear as this description proceeds.

The process of this invention will now be described in detail, in connection with the accompanying drawing, which is in the form of a flow sheet illustrating a typical procedure or sequence of steps; without however intending to limit the invention other than as set forth in the accompanying claims.

The mixture of cadmium and zinc compounds to be treated in accordance with this invention is in the form of a water solution of cadmium and zinc salts. Although any water-soluble zinc and cadmium salts may be treated by the process of this invention, those commonly encountered in practice are the sulfates, alone or mixed with the chlorides. Furthermore, the procedure of this invention gives a more selective separation of the zinc and cadmium ions when they are fed as sulfates. While any proportions of one metal to the other may be handled by the instant process, it is noted that the usual commercial mixtures run between about 1½ and 10 grams per liter of Cd and about 20 to 50 grams per liter of Zn.

The water solution of zinc and cadmium salts is then subjected to an extraction step, preferably in several stages, with a water-insoluble quaternary ammonium halide in liquid phase. This quaternary ammonium halide is ordinarily itself a liquid, but if a solid, it must be dissolved in an organic solvent. Even if the quaternary is normally a liquid, it may be sufficiently thick that the addition of an organic solvent therefor is desirable or necessary for effective handling in the process of this invention. The cadmium compounds thereby all pass into the water-insoluble quaternary phase, while nearly all the zinc compounds remain in the aqueous phase, and are thus removed from the system free of cadmium ions. The quaternary phase is then stripped by contacting with an aqueous solution of an alkaline compound capable of precipitating cadmium as an insoluble salt thereof, preferably ammonium carbonate, in excess, whereby the cadmium is precipitated, e.g., as carbonate, and the ammonium is converted to sulfate or other salt, depending on the nature of the feed. Ammonium carbonate is the preferred precipitant, and in fact is necessary if any zinc ions are present in the quaternary effluent to be stripped and if the cadmium is to be precipitated free of zinc.

The precipitated cadmium salt is removed by any convenient means such as filtering or decantation. The remaining liquid is in two phases, the quaternary and the aqueous. The aqueous phase contains the ammonium ions, as sulfate if the feed contained the cadmium and zinc as sulfates, any residual zinc from the initial extraction, and the excess of the ammonium carbonate or other alkaline precipitant. This phase may be processed for recovery of values therein, by conventional methods, if desirable. The quaternary phase therefore has been stripped of the cadmium and other compounds dissolved in or mixed with it and can consequently be returned to the extraction step for reuse.

The zinc values recovered in the aqueous moiety of the extraction step are the same as those in the original feed, and may be separated from the water and reacted or otherwise treated or used in known fashion.

The precipitated cadmium compound may be washed and otherwise treated, and reacted or used, likewise in known fashion.

The quaternary ammonium halide is a water-insoluble liquid, and may be represented by the formula $R_4NX$, wherein X is halogen, specifically chlorine, bromine, or iodine. Iodine is the best of the halogens for effecting separation, and bromine is next, although all are operative in this process. They may also be present as a mixture of two or all three, depending upon the effectiveness of separation desired or the thoroughness of extraction.

Since the quaternary ammonium halide used herein is employed in the form of a liquid phase, it can be readily passed through the process as a liquid in intimate contact with the other liquids in the process, thus facilitating thorough contact of all the reactants. No special provisions as to temperature or pH are required; the quaternary is operable at any pH likely to be encountered in the process. However, as the quaternary is usually either a rather thick and viscous liquid, or may even be a solid or a semi-solid, it is preferably thinned with a water-immiscible organic solvent therefor, e.g., xylene or toluene, to make it more easily handled in the process.

Suitable examples of the quaternary compounds used herein are those wherein $R_4N$— is tricapryl methyl ammonium, or distearyl dimethyl ammonium. The R's may be alike or different, and they comprise at least two hydrocarbon groups of at least 8 carbon atoms each. They may include aryl or cycloalkyl groups. The total number of carbon atoms in the $R_4$ radical is at least 18.

The extraction step is conveniently carried out in a series of countercurrent extractions, the number of which and the ratio of aqueous to organic phases are not critical except that they should obviously be such as to effect the desired separation. The same is true of the stripping step.

As a specific example, however, starting with an aqueous feed containing about 5 g./liter Cd and 40 g./liter Zn, both as sulfates, extraction is carried out in six stages with a quaternary ammonium iodide of the type herein described, in 0.5 N solution in xylene. The ratio of aqueous to organic phases in the extractions is about 3:1. Zinc sulfate free of cadmium passes out with the final aqueous phase; the final organic phase is a mixture of the cadmium sulfate and the quaternary ammonium iodide and/or reaction products thereof (the exact composition not being material for an understanding of the present invention). A small amount of zinc compound may also be present.

Ammonium carbonate in water solution is contacted with this organic phase. The molar concentration of ammonium carbonate in the water is not critical, but for convenient operation 1 N to 3 N is useful. The amount used in proportion to the organic phase should obviously be such that all the cadmium is precipitated as carbonate, and it is best to have an excess of the ammonium carbonate to assure complete precipitation.

The quaternary emerges from the stripping step in its original form, i.e., in xylene solution, and is thus ready for reuse in the extraction step. Consequently, there is no loss of the quaternary compound, other than trivial amounts which may pass out with the cadmium carbonate or the zinc sulfate.

Three components accordingly emerge from the stripping step: solid cadmium carbonate precipitate, quaternary ammonium iodide in xylene, and an aqueous phase. The latter contains ammonium sulfate, excess ammonium carbonate, and any zinc which had reached the stripping operation. The ammonium sulfate is of course produced by reaction between the ammonium carbonate and the cadmium sulfate-quaternary ammonium iodide composition.

I claim:
1. A process for the removal of cadmium ions from aqueous solution of cadmium and zinc sulfates which comprises:
   (a) repeatedly extracting said solution with an organic solution of a quaternary ammonium halide,
   (b) said solutions being immiscible with each other,
   (c) said quaternary ammonium halide having the formula $R_4NX$ wherein X is a halogen selected from the group consisting of chlorine, bromine and iodine and $R_4$ is hydrocarbon radical containing at least 18 carbon atoms and contains at least two hydrocarbon groups having at least 8 carbon atoms each,
   (d) continuing said extracting until substantially all of said cadmium ions are in the organic phase and substantially all of said zinc ions are in the aqueous phase,
   (e) separating the organic phase and the aqueous phase,
   (f) stripping said organic phase by contacting the same with an aqueous solution of ammonium carbonate, until substantially all of said cadmium ions are precipitated as cadmium carbonate, and
   (g) separating out said cadmium carbonate.
2. A process in accordance with claim 1 wherein the liquid mixture resulting from said stripping step is separated into its two phases, and the organic phase is returned for recycling in the extraction step.
3. A process in accordance with claim 1 wherein said liquid quaternary ammonium halide is in solution in xylene.
4. A process in accordance with claim 1 wherein $R_4NX$ is tricapryl methyl ammonium halide.
5. A process in accordance with claim 1 wherein $R_4NX$ is distearyl dimethyl ammonium halide.
6. A process in accordance with claim 1 wherein X is iodine.
7. A process for separation of cadmium and zinc ions from aqueous solution of soluble salts of cadmium and zinc, which comprises
   (a) extracting said solution with an organic liquid quaternary ammonium halide immiscible with said solution,
   (b) said quaternary ammonium halide having the formula $R_4NX$ wherein X is selected from the group consisting of bromine and iodine and the total number of carbon atoms in $R_4$ is at least 18,
   (c) separating the resulting two-phase liquid into its phases, the aqueous phase containing the zinc ions and the organic phase containing the cadmium ions,
   (d) stripping said organic phase by contacting it with a liquid medium which effects precipitation of the cadmium ions as an insoluble cadmium compound,
   (e) separating out said precipitated cadmium compound, and
   (f) returning the stripped quaternary ammonium halide to the aforesaid extraction step.
8. A process in accordance with claim 7 wherein said liquid quaternary ammonium halide contains at least two hydrocarbon groups of at least 8 carbon atoms each.
9. A process in accordance with claim 7 wherein said liquid stripping medium comprises an alkaline compound which effects precipitation of said insoluble cadmium compound.
10. A process in accordance with claim 9 wherein said alkaline compound is ammonium carbonate.

References Cited by the Examiner
UNITED STATES PATENTS

| | | | |
|---|---|---|---|
| 1,778,987 | 10/1930 | Stevens et al. | 23—125 |
| 3,082,062 | 3/1963 | Preuss | 210—21 X |

OSCAR R. VERTIZ, *Primary Examiner.*

BENJAMIN HENKIN, *Examiner.*

G. T. OZAKI, *Assistant Examiner.*